US012218440B2

(12) United States Patent
Wu et al.

(10) Patent No.: US 12,218,440 B2
(45) Date of Patent: Feb. 4, 2025

(54) ANTENNA STRUCTURE

(71) Applicant: Wistron NeWeb Corp., Hsinchu (TW)

(72) Inventors: Tzu-Min Wu, Hsinchu (TW); Kuo-Jen Lai, Hsinchu (TW); Kuang-Yuan Ku, Hsinchu (TW); Hung-Ying Lin, Hsinchu (TW); Wen-Tai Tseng, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 162 days.

(21) Appl. No.: 18/317,147

(22) Filed: May 15, 2023

(65) Prior Publication Data

US 2023/0411853 A1 Dec. 21, 2023

(30) Foreign Application Priority Data

Jun. 16, 2022 (TW) ................................ 111122401

(51) Int. Cl.
*H01Q 9/04* (2006.01)

(52) U.S. Cl.
CPC ......... *H01Q 9/0414* (2013.01); *H01Q 9/0421* (2013.01)

(58) Field of Classification Search
CPC ...... H01Q 9/0414; H01Q 9/0421; H01Q 1/48; H01Q 5/385
See application file for complete search history.

(56) References Cited

U.S. PATENT DOCUMENTS

2007/0285321 A1* 12/2007 Chung .................. H01Q 5/371 343/702
2011/0122027 A1* 5/2011 Wong ..................... H01Q 9/045 343/700 MS

* cited by examiner

*Primary Examiner* — Dieu Hien T Duong
(74) *Attorney, Agent, or Firm* — McClure, Qualey & Rodack, LLP

(57) ABSTRACT

An antenna structure includes a ground element, a feeding radiation element, a first radiation element, a second radiation element, a first coupling branch, and a dielectric substrate. The feeding radiation element has a feeding point. The first radiation element is coupled to the feeding radiation element. The second radiation element is coupled to the feeding radiation element. The second radiation element and the first radiation element substantially extend in opposite directions. The first coupling branch is coupled to a first grounding point on the ground element. The first coupling branch extends across the first radiation element. The first coupling branch includes a first coil portion and a first connection portion.

20 Claims, 6 Drawing Sheets

ANTENNA STRUCTURE

CROSS REFERENCE TO RELATED APPLICATIONS

This application claims priority of Taiwan Patent Application No. 111122401 filed on Jun. 16, 2022, the entirety of which is incorporated by reference herein.

BACKGROUND OF THE INVENTION

Field of the Invention

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has insufficient bandwidth, it will degrade the communication quality of the relative mobile device. Accordingly, it has become a critical challenge for antenna designers to design a small-size, wideband antenna element.

BRIEF SUMMARY OF THE INVENTION

In an exemplary embodiment, the invention is directed to an antenna structure that includes a ground element, a feeding radiation element, a first radiation element, a second radiation element, a first coupling branch, and a dielectric substrate. The feeding radiation element has a feeding point. The first radiation element is coupled to the feeding radiation element. The second radiation element is coupled to the feeding radiation element. The second radiation element and the first radiation element substantially extend in opposite directions. The first coupling branch is coupled to a first grounding point on the ground element. The first coupling branch extends across the first radiation element. The first coupling branch includes a first coil portion and a first connection portion. The dielectric substrate has a first surface and a second surface which are opposite to each other. The feeding radiation element, the first radiation element, the second radiation element, and the first connection portion of the first coupling branch are distributed over the first surface of the dielectric substrate. The first coil portion of the first coupling branch is distributed over the second surface of the dielectric substrate.

In another exemplary embodiment, the invention is directed to an antenna structure that includes a ground element, a feeding radiation element, a first radiation element, a second radiation element, a first coupling branch, a second coupling branch, and a dielectric substrate. The feeding radiation element has a feeding point. The first radiation element is coupled to the feeding radiation element. The second radiation element is coupled to the feeding radiation element. The second radiation element and the first radiation element substantially extend in opposite directions. The first coupling branch includes a coil portion and a first coupling segment. The first coupling branch and the second coupling branch are coupled to a common grounding point on the ground element. The dielectric substrate has a first surface and a second surface which are opposite to each other. The feeding radiation element, the first radiation element, and the second radiation element are distributed over the first surface of the dielectric substrate. The coil portion of the first coupling branch is distributed over the second surface of the dielectric substrate. The feeding radiation element, the first radiation element, and the second radiation element are positioned between the ground element and the first coupling branch or the second coupling branch.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1A:
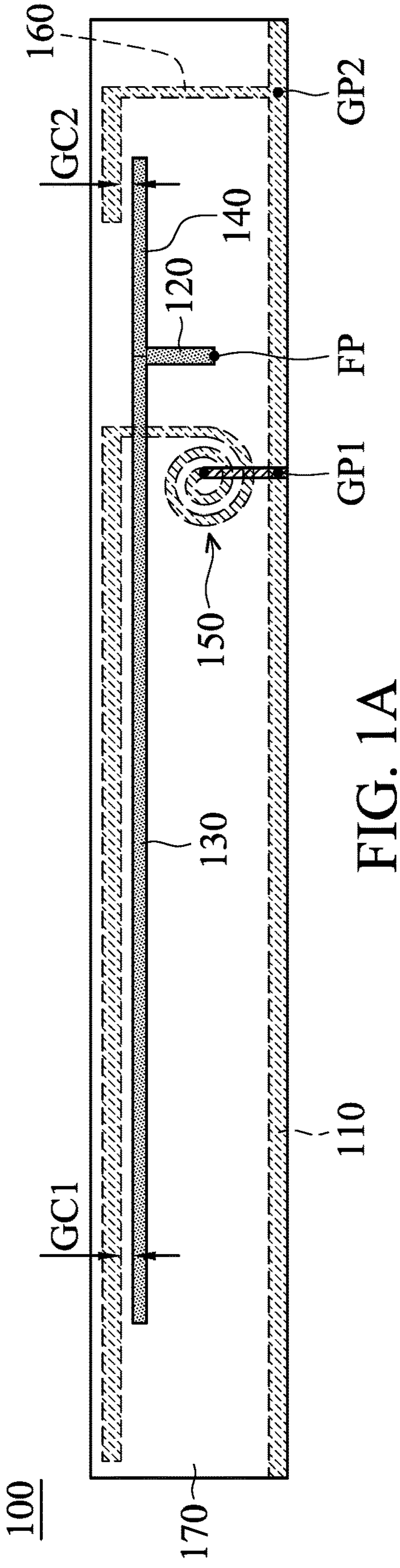
FIG. 1A is a top view of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1A is a top view of an antenna structure 100 according to an embodiment of the invention. The antenna structure 100 may be applied to a mobile device, such as a smart phone, a tablet computer, or a notebook computer. In the embodiment of FIG. 1A, the antenna structure 100 includes a ground element 110, a feeding radiation element 120, a first radiation element 130, a second radiation element 140, a first coupling branch 150, a second coupling branch 160, and a dielectric substrate 170. The ground element 110, the feeding radiation element 120, the first radiation element 130, the second radiation element 140, the first coupling branch 150, and the second coupling branch 160 may all be made of metal materials, such as copper, silver, aluminum, iron, or their alloys. However, the invention is not limited thereto. In alternative embodiments, the antenna structure 100 does not include the second coupling branch 160 as mentioned above.

Figure 1B:
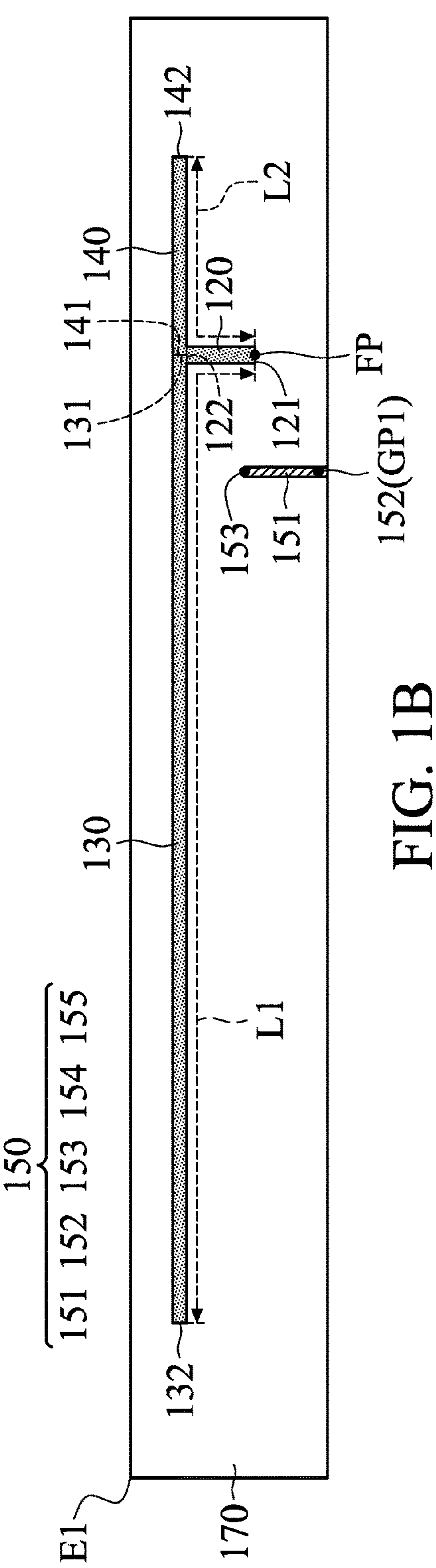
FIG. 1B is a top view of partial elements of an antenna structure on a first surface of a dielectric substrate according to an embodiment of the invention.
Figure 1C:
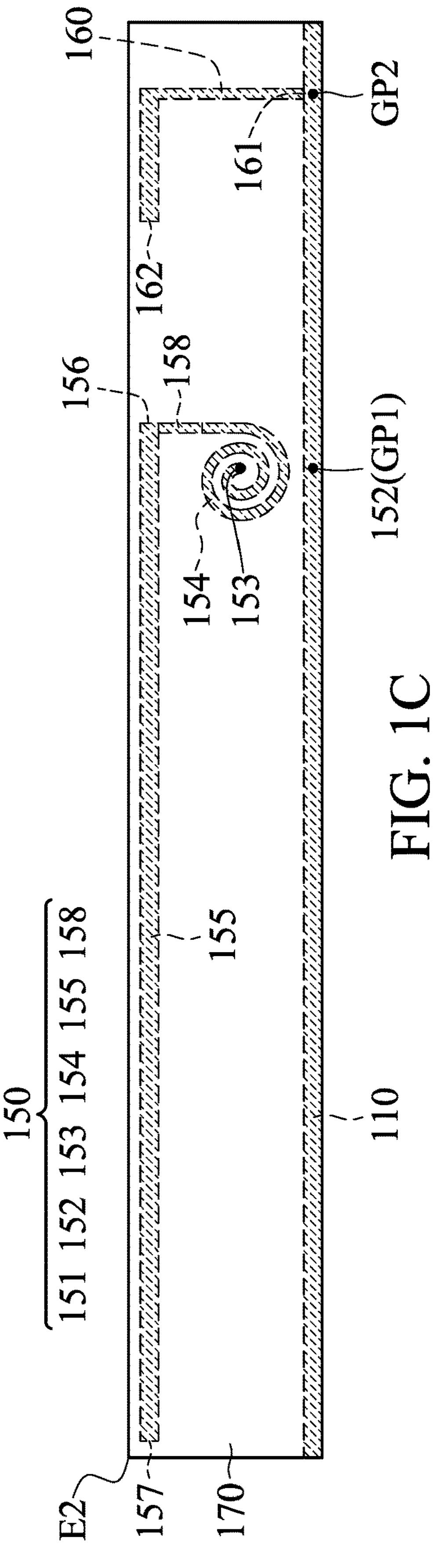
FIG. 1C is a see-through view of other partial elements of an antenna structure on a second surface of a dielectric substrate according to an embodiment of the invention.
Figure 1D:
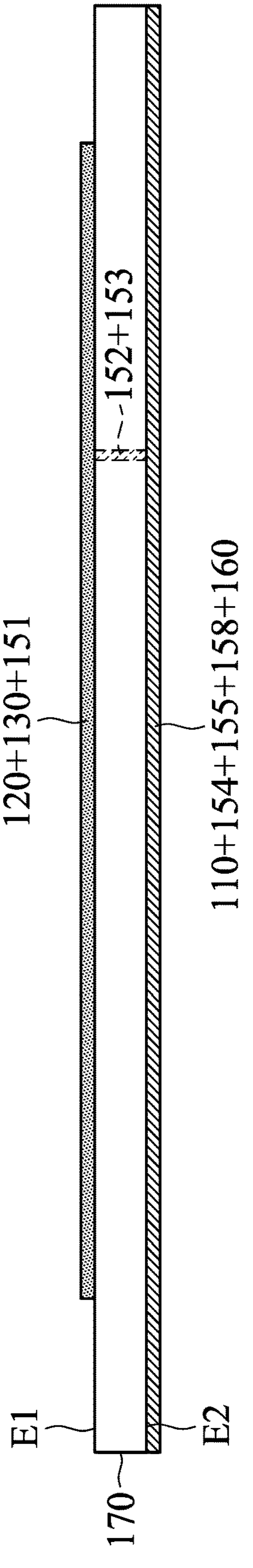
FIG. 1D is a side view of an antenna structure according to an embodiment of the invention.

The dielectric substrate 170 may be an FR4 (Flame Retardant 4) substrate, a PCB (Printed Circuit Board), or an FPC (Flexible Printed Circuit). The dielectric substrate 170 has a first surface E1 and a second surface E2 which are opposite to each other. The feeding radiation element 120, the first radiation element 130, and the second radiation element 140 may be mainly distributed over the first surface E1 of the dielectric substrate 170. The ground element 110, the first coupling branch 150, and the second coupling branch 160 may be mainly distributed over the second surface E2 of the dielectric substrate 170. The ground element 110 may be implemented with a ground copper foil, which may extend beyond the dielectric substrate 170 and may be coupled to a system ground plane (not shown). FIG. 1B is a top view of partial elements of the antenna structure 100 on the first surface E1 of the dielectric substrate 170 according to an embodiment of the invention. FIG. 1C is a see-through view of other partial elements of the antenna structure 100 on the second surface E2 of the dielectric substrate 170 according to an embodiment of the invention (i.e., the dielectric substrate 170 is considered as a transparent element). FIG. 1D is a side view of the antenna structure 100 according to an embodiment of the invention. Please refer to FIG. 1A, FIG. 1B, FIG. 1C, and FIG. 1D together.

Specifically, the feeding radiation element 120 has a first end 121 and a second end 122. A feeding point FP is positioned at the first end 121 of the feeding radiation element 120. The feeding point FP may be further coupled to a signal source (not shown). For example, the aforementioned signal source may be an RF (Radio Frequency) module for exciting the antenna structure 100. The first radiation element 130 has a first end 131 and a second end 132. The first end 131 of the first radiation element 130 is coupled to the second end 122 of the feeding radiation element 120. The second end 132 of the first radiation element 130 is an open end. The second radiation element 140 has a first end 141 and a second end 142. The first end 141 of the second radiation element 140 is coupled to the second end 122 of the feeding radiation element 120. The second end 142 of the second radiation element 140 is an open end. For example, the second end 142 of the second radiation element 140 and the second end 132 of the first radiation element 130 may substantially extend in opposite directions and away from each other. In some embodiments, the combination of the feeding radiation element 120, the first radiation element 130, and the second radiation element 140 may substantially have a T-shape.

The first coupling branch 150 is coupled to a first grounding point GP1 on the ground element 110. The first coupling branch 150 extends across the first radiation element 130. Specifically, the first coupling branch 150 includes a first connection portion 151, a first conductive via element 152, a second conductive via element 153, a first coil portion 154, a first coupling segment 155, and a first connection segment 158. The first connection portion 151 is disposed on the first surface E1 of the dielectric substrate 170. The first conductive via element 152 and the second conductive via element 153 penetrate the dielectric substrate 170. The first coil portion 154, the first coupling segment 155, and the first connection segment 158 are disposed on the second surface E2 of the dielectric substrate 170. The first connection portion 151 may substantially have a straight-line shape. An end of the first connection portion 151 is coupled through the first conductive via element 152 to the first grounding point GP1, and another end of the first connection portion 151 is coupled through the second conductive via element 153 to an end of the first coil portion 154. In some embodiments, the first radiation element 130 has a vertical projection on the second surface E2 of the dielectric substrate 170. The vertical projection of the first radiation element 130 at least partially overlaps the first coil portion 154, the first connection segment 158, and/or the first coupling segment 155. The first coupling segment 155 has a first end 156 and a second end 157. The first end 156 of the first coupling segment 155 is coupled through the first connection segment 158 to another end of the first coil portion 154. The second end 157 of the first coupling segment 155 is an open end. For example, a first coupling gap GC1 may be formed between the first radiation element 130 and the first coupling segment 155 of the first coupling branch 150. However, the invention is not limited thereto. In alternative embodiments, the ground element 110 and the first coupling segment 155 of the first coupling branch 150 are disposed on the first surface E1 of the dielectric substrate 170, and they are connected thereto through corresponding conductive via elements (not shown).

The second coupling branch 160 may be adjacent to the second radiation element 140. Specifically, the second coupling branch 160 has a first end 161 and a second end 162. The first end 161 of the second coupling branch 160 is coupled to a second grounding point GP2 on the ground element 110. The second end 162 of the second coupling branch 160 is an open end. The second grounding point GP2 is different from the aforementioned first grounding point GP1. For example, the second end 162 of the second coupling branch 160 and the second end 157 of the first coupling segment 155 of the first coupling branch 150 may substantially extend in the same direction. In addition, a second coupling gap GC2 may be formed between the second radiation element 140 and the second coupling branch 160. In this embodiment, the second coupling branch 160 is disposed on the second surface E2 of the dielectric substrate 170. In alternative embodiments, the second coupling branch 160 is disposed on the first surface E1 of the dielectric substrate 170, and it is connected thereto through corresponding conductive via elements (not shown). It should be noted that the term "adjacent" or "close" over the disclosure means that the distance (spacing) between two corresponding elements is smaller than a predetermined distance (e.g., 5 mm or shorter), but often does not mean that the two corresponding elements directly touch each other (i.e., the aforementioned distance/spacing therebetween is reduced to 0). In some embodiments, the second coupling branch 160 may substantially have an inverted L-shape.

According to practical measurements, the antenna structure 100 can cover a low-frequency band and a high-frequency band. For example, the low-frequency band may be from 600 MHz to 960 MHz, and the high-frequency band may be from 1100 MHz to 6000 MHz. Therefore, the antenna structure 100 can cover at least the wideband operations of LTE (Long Term Evolution). With respect to the antenna theory, the first coupling branch 150 is excited by the feeding radiation element 120 and the first radiation element 130 using a coupling mechanism, so as to form the aforementioned low-frequency band. Also, the second coupling branch 160 is excited by the feeding radiation element 120 and the second radiation element 140 using another coupling mechanism, so as to form the aforementioned high-frequency band. It should be noted that the total manufacturing cost of the invention can be further reduced since a conventional inductive circuit is replaced with the first coil portion 154 of the first coupling branch 150.

In some embodiments, the element sizes and parameters of the antenna structure 100 will be described as follows. The total length L1 of the feeding radiation element 120 and the first radiation element 130 may be shorter than or equal to 0.5 wavelength (λ/2) of the low-frequency band of the antenna structure 100. The total length L2 of the feeding radiation element 120 and the second radiation element 140 may be shorter than or equal to wavelength (λ/2) of the high-frequency band of the antenna structure 100. The width of the first coupling gap GC1 may be shorter than or equal to 2 mm. The width of the second coupling gap GC2 may be shorter than or equal to 2 mm. The effective inductance of the first coil portion 154 of the first coupling branch 150 may be greater than or equal to 1 nH. The above ranges of element sizes and parameters are calculated and obtained according to many experiment results, and they help to optimize the operational bandwidth and impedance matching of the antenna structure 100.

The following embodiments will introduce other configurations and detailed structural features of the antenna structure 100. It should be understood that these figures and descriptions are merely exemplary, rather than limitations of the invention.

Figure 2:
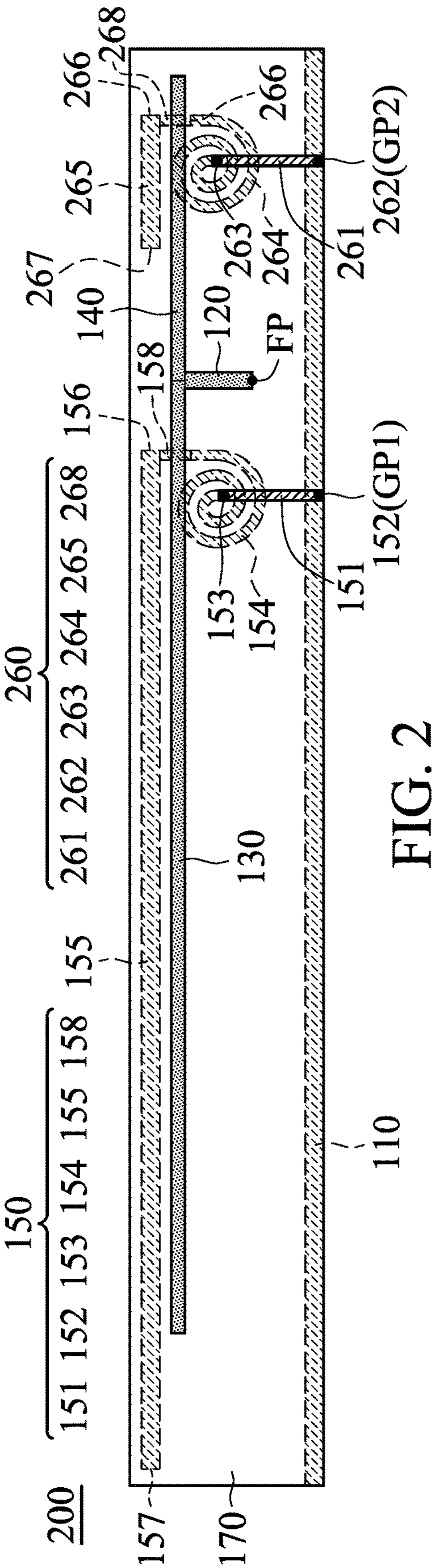
FIG. 2 is a top view of an antenna structure according to an embodiment of the invention.

FIG. 2 is a top view of an antenna structure 200 according to an embodiment of the invention. FIG. 2 is similar to FIG. 1A. In the embodiment of FIG. 2, a second coupling branch 260 of the antenna structure 200 extends across the second radiation element 140. Specifically, the second coupling branch 260 includes a second connection portion 261, a third conductive via element 262, a fourth conductive via element 263, a second coil portion 264, a second coupling segment 265, and a second connection segment 268. The second connection portion 261 is disposed on the first surface E1 of the dielectric substrate 170. The third conductive via element 262 and the fourth conductive via element 263 penetrate the dielectric substrate 170. The second coil portion 264, the second connection segment 268, and the second coupling segment 265 are disposed on the second surface E2 of the dielectric substrate 170. The second connection portion 261 may substantially have a straight-line shape. An end of the second connection portion 261 is coupled through the third conductive via element 262 to the second grounding point GP2, and another end of the second connection portion 261 is coupled through the fourth conductive via element 263 to an end of the second coil portion 264. In some embodiments, the second radiation element 140 has a vertical projection on the second surface E2 of the dielectric substrate 170. The vertical projection of the second radiation element 140 at least partially overlap the second coil portion 264, the second connection segment 268, and/or the second coupling segment 265. The second coupling segment 265 has a first end 266 and a second end 267. The first end 266 of the second coupling segment 265 is coupled through the second connection segment 268 to another end of the second coil portion 264. The second end 267 of the second coupling segment 265 is an open end. For example, the second end 267 of the second coupling segment 265 of the second coupling branch 260 and the second end 157 of the first coupling segment 155 of the first coupling branch 150 may substantially extend in the same direction. In the embodiment of FIG. 2, the position of the first coil portion 154 of the first coupling branch 150 is slightly moved upwardly, such that the vertical projection of the first radiation element 130 at least partially overlaps the first coil portion 154 and the first connection segment 158 of the first coupling branch 150. It should be noted that the whole impedance matching of the antenna structure 200 is fine-tuned by increasing the coupling amounts between the first radiation element 130, the second radiation element 140, the first coupling branch 150, and the second coupling branch 260. Other features of the antenna structure 200 of FIG. 2 are similar to those of the antenna structure 100 of FIG. 1A, FIG. 1B, FIG. 1C, and FIG. 1D. Accordingly, the two embodiments can achieve similar levels of performance.

Figure 3:
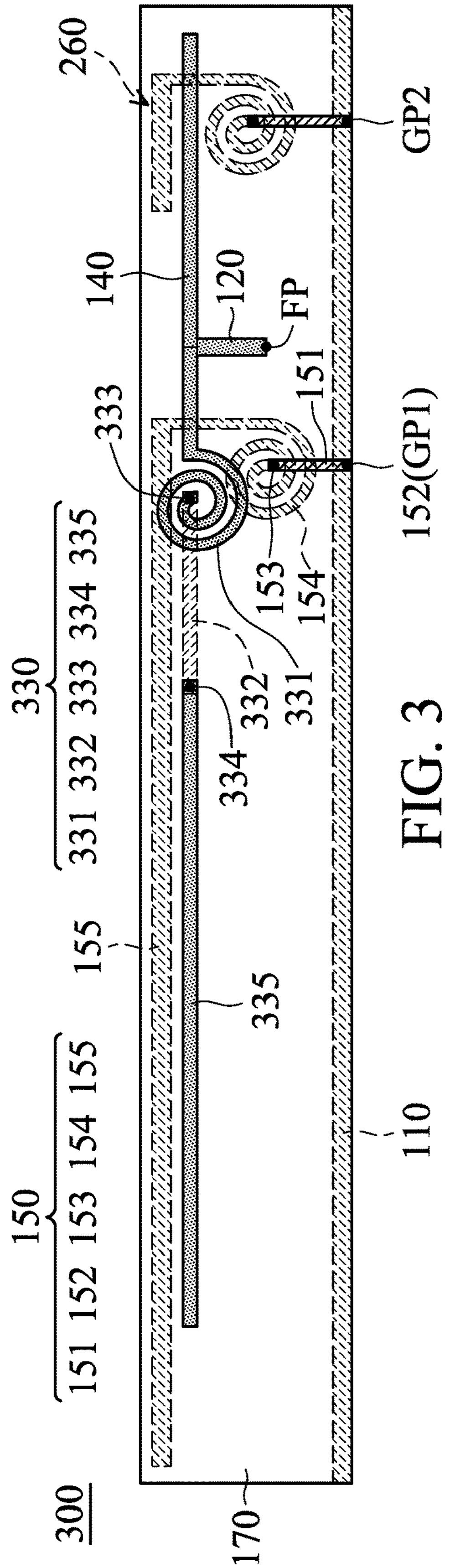
FIG. 3 is a top view of an antenna structure according to an embodiment of the invention.

FIG. 3 is a top view of an antenna structure 300 according to an embodiment of the invention. FIG. 3 is similar to FIG. 2. In the embodiment of FIG. 3, a first radiation element 330 of the antenna structure 300 includes a third coil portion 331, a third connection portion 332, a fifth conductive via element 333, a sixth conductive via element 334, and a straight-line portion 335. The third coil portion 331 and the straight-line portion 335 are disposed on the first surface E1 of the dielectric substrate 170. The fifth conductive via element 333 and the sixth conductive via element 334 penetrate the dielectric substrate 170. The third connection portion 332 is disposed on the second surface E2 of the dielectric substrate 170. An end of the third coil portion 331 is coupled to the feeding radiation element 120 and the second radiation element 140. An end of the third connection portion 332 is coupled through the fifth conductive via element 333 to another end of the third coil portion 331, and another end of the third connection portion 332 is coupled through the sixth conductive via element 334 to the straight-line portion 335. It should be noted that because the first radiation element 330 additionally uses the third coil portion 331, whose vertical projection at least partially overlaps the first coil portion 154 of the first coupling branch 150, the coupling amount between the first radiation element 330 and the first coupling branch 150 is significantly increased. The third coil portion 331 of the first radiation element 330 not only increases the length of the resonant path but also enhances the effective inductance, thereby solving the problem of insufficient space of antenna designs. Other features of the antenna structure 300 of FIG. 3 are similar to those of the antenna structure 200 of FIG. 2. Accordingly, the two embodiments can achieve similar levels of performance.

Figure 4C:
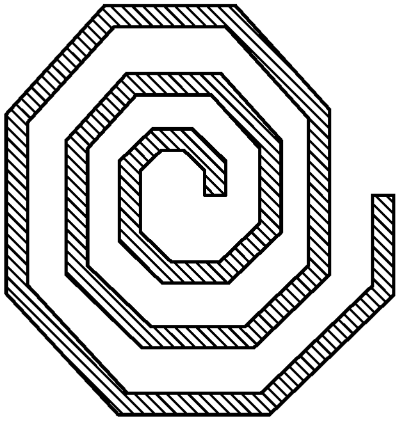
FIG. 4C is a top view of a coil portion according to an embodiment of the invention.
Figure 4B:
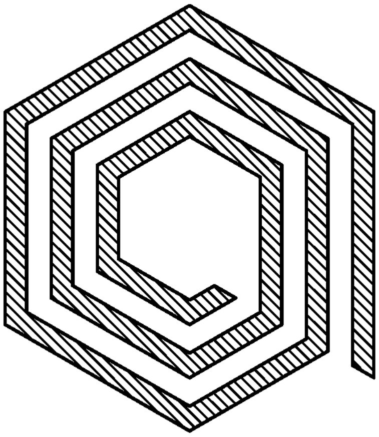
FIG. 4B is a top view of a coil portion according to an embodiment of the invention.
Figure 4A:
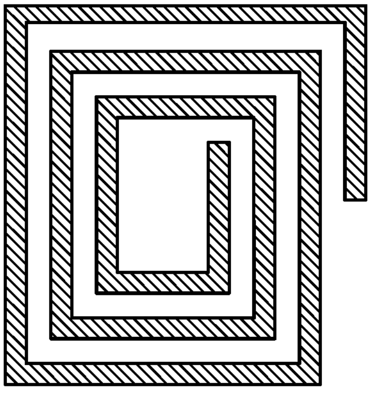
FIG. 4A is a top view of a coil portion according to an embodiment of the invention.

FIG. 4A is a top view of a coil portion according to an embodiment of the invention. FIG. 4B is a top view of a coil portion according to an embodiment of the invention. FIG. 4C is a top view of a coil portion according to an embodiment of the invention. It should be understood that in addition to the above circular coil portions, the shape of each coil portion of the invention is adjustable according to different requirements. For example, a square coil portion, a hexagonal coil portion, or an octagonal coil portion may be applied to any embodiment of the invention.

Figure 5:
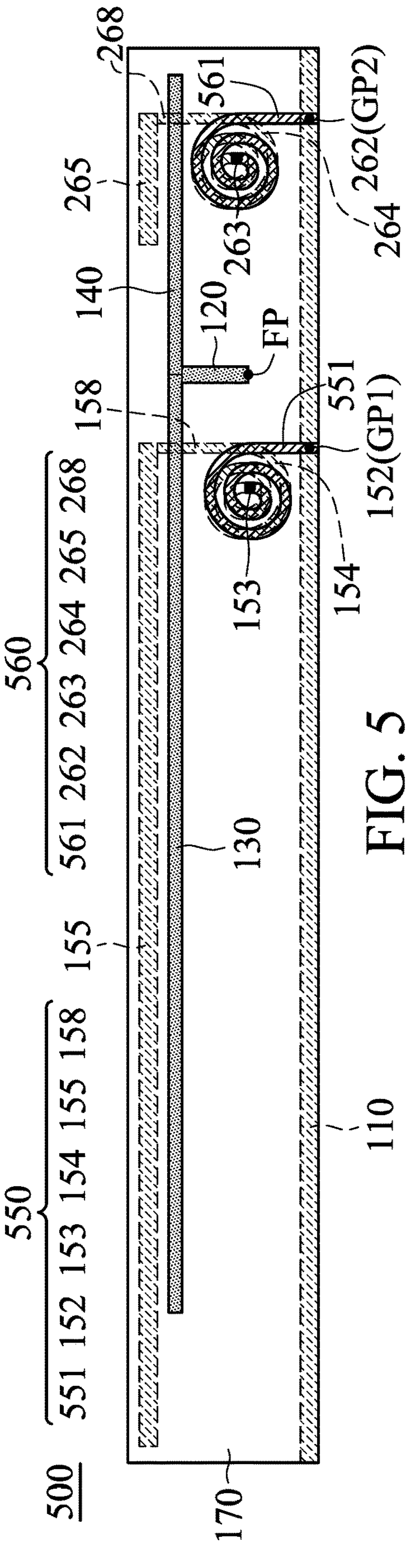
FIG. 5 is a top view of an antenna structure according to an embodiment of the invention.

FIG. 5 is a top view of an antenna structure 500 according to an embodiment of the invention. FIG. 5 is similar to FIG. 2. In the embodiment of FIG. 5, a first connection portion 551 of a first coupling branch 550 of the antenna structure 500 substantially has a spiral shape, whose vertical projection ate least partially overlaps the first coil portion 154. Similarly, a second connection portion 561 of a second coupling branch 560 of the antenna structure 500 substantially has another spiral shape, whose vertical projection ate least partially overlaps the second coil portion 264. It should be noted that the whole impedance matching of the antenna structure 500 is fine-tuned by increasing the coupling amounts and the effective inductances between the first radiation element 130, the second radiation element 140, the first coupling branch 550, and the second coupling branch 560. Furthermore, the dual-spiral design can also save the total antenna design space. Other features of the antenna structure 500 of FIG. 5 are similar to those of the antenna structure 200 of FIG. 2. Accordingly, the two embodiments can achieve similar levels of performance.

Figure 6:
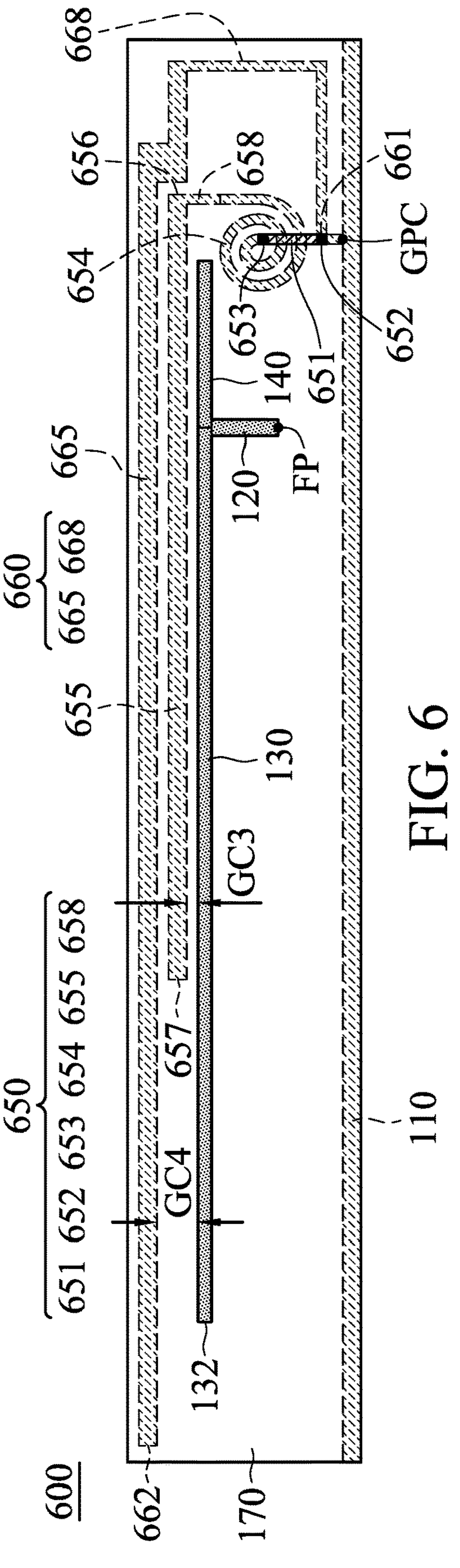
FIG. 6 is a top view of an antenna structure according to an embodiment of the invention.

FIG. 6 is a top view of an antenna structure 600 according to an embodiment of the invention. FIG. 6 is similar to FIG. 1A. In the embodiment of FIG. 6, the antenna structure 600 includes a ground element 110, a feeding radiation element 120, a first radiation element 130, a second radiation element 140, a first coupling branch 650, a second coupling branch 660, and a dielectric substrate 170. The dielectric substrate 170 has a first surface E1 and a second surface E2 which are opposite to each other. Generally, the feeding radiation element 120, the first radiation element 130, and the second radiation element 140 are positioned between the ground element 110 and the first coupling branch 650 or the second coupling branch 660. The first coupling branch 650 and the second coupling branch 660 are both coupled to a common grounding point GPC on the ground element 110. Specifically, the first coupling branch 650 includes a connection portion 651, a first conductive via element 652, a second conductive via element 653, a coil portion 654, a first coupling segment 655, and a first connection segment 658. The connection portion 651 is disposed on the first surface E1 of the dielectric substrate 170. The first conductive via element 652 and the second conductive via element 653 penetrate the dielectric substrate 170. The coil portion 654, the first coupling segment 655, the first connection segment 658, and the second coupling branch 660 are disposed on the second surface E2 of the dielectric substrate 170. However, the invention is not limited thereto. In alternative embodiments, the ground element 110, the first coupling segment 655 of the first coupling branch 650, and the second coupling branch 660 are disposed on the first surface E1 of the dielectric substrate 170, and they are connected thereto through corresponding conductive via elements (not shown).

An end of the connection portion 651 is coupled through the first conductive via element 652 to the common grounding point GPC, and another end of the connection portion 651 is coupled through the second conductive via element 653 to an end of the coil portion 654. The first coupling segment 655 has a first end 656 and a second end 657. The first end 656 of the first coupling segment 655 is coupled through the first connection segment 658 to another end of the coil portion 654. The second end 657 of the first coupling segment 655 is an open end. In some embodiments, the second end 657 of the first coupling segment 655 does not extend beyond the second end 132 of the first radiation element 130. A first coupling gap GC3 may be formed between the first radiation element 130 and the first coupling segment 655 of the first coupling branch 650. The width of the first coupling gap GC3 may be shorter than or equal to 2 mm. In some embodiments, the second coupling branch 660 may substantially have a meandering shape. The first coupling segment 655 of the first coupling branch 650 is disposed between the first radiation element 130 and the second coupling branch 660. The second coupling branch 660 has a first end 661 and a second end 662. The first end 661 of the second coupling branch 660 is coupled to the common grounding point GPC. The second end 662 of the second coupling branch 660 is an open end. In some embodiments, the second end 662 of the second coupling branch 660 extends beyond the second end 132 of the first radiation element 130. Specifically, the second coupling branch 660 includes a second connection segment 668 adjacent to the first end 661 and a second coupling segment 665 adjacent to the second end 662. A second coupling gap GC4 may be formed between the first radiation element 130 and the second coupling branch 660. The width of the second coupling branch GC4 may be shorter than or equal to 3 mm. In alternative embodiments, the position of the first coupling branch 650 is exchanged with that of the second coupling branch 660. The antenna structure 600 can cover a low-frequency band and a high-frequency band. The low-frequency band may be from 600 MHz to 960 MHz. The high-frequency band may be from 1100 MHz to 6000 MHz. According to practical measurements, the incorporation of the coil portion 654 of the first coupling branch 650 can make the aforementioned high-frequency band shift and become lower. Other features of the antenna structure 600 of FIG. 6 are similar to those of the antenna structure 100 of FIG. 1A, FIG. 1B, FIG. 1C, and FIG. 1D. Accordingly, the two embodiments can achieve similar levels of performance.

Figure 7:
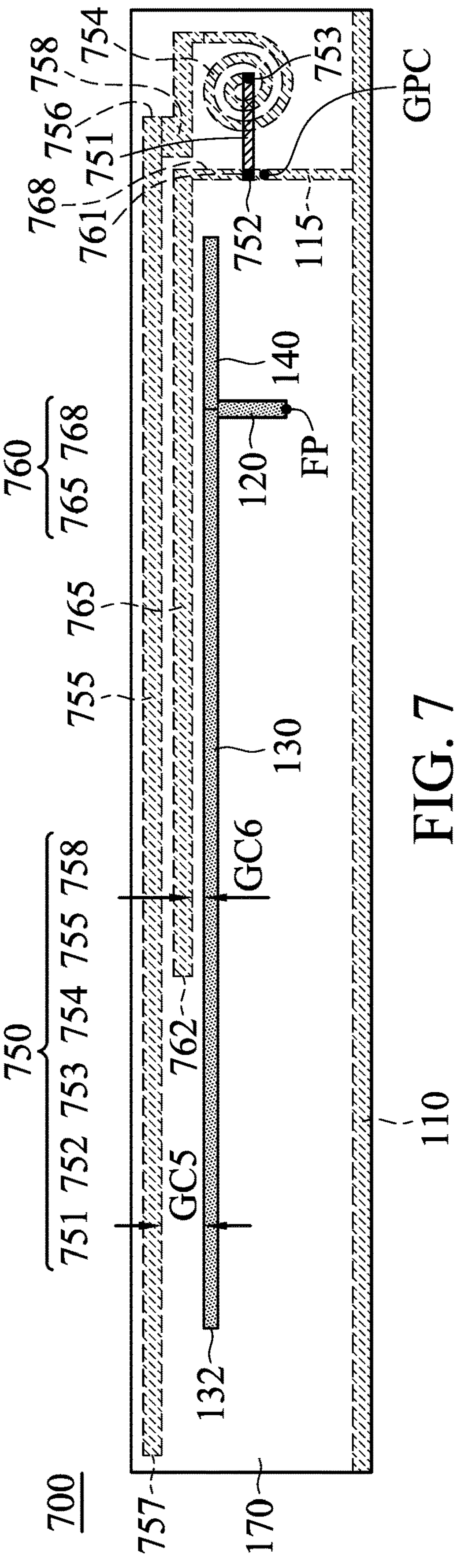
FIG. 7 is a top view of an antenna structure according to an embodiment of the invention.

FIG. 7 is a top view of an antenna structure 700 according to an embodiment of the invention. FIG. 7 is similar to FIG. 1A. In the embodiment of FIG. 7, the antenna structure 700 includes a ground element 110, a feeding radiation element 120, a first radiation element 130, a second radiation element 140, a first coupling branch 750, a second coupling branch 760, and a dielectric substrate 170. The dielectric substrate 170 has a first surface E1 and a second surface E2 which are opposite to each other. The first coupling branch 750 and the second coupling branch 760 are both coupled to a common grounding point GPC on the ground element 110. For example, the ground element 110 may include a grounding branch 115, and the common grounding point GPC may be positioned at an end of the grounding branch 115. Specifically, the first coupling branch 750 includes a connection portion 751, a first conductive via element 752, a second conductive via element 753, a coil portion 754, a first coupling segment 755, and a first connection segment 758. The connection portion 751 is disposed on the first surface E1 of the dielectric substrate 170. The first conductive via element 752 and the second conductive via element 753 penetrate the dielectric substrate 170. The coil portion 754, the first coupling segment 755, the first connection segment 758, and the second coupling branch 760 are disposed on the second surface E2 of the dielectric substrate 170. However, the invention is not limited thereto. In alternative embodiments, the ground element 110 and the first coupling segment 755 of the first coupling branch 750 are disposed on the first surface E1 of the dielectric substrate 170, and they are connected thereto through corresponding conductive via elements (not shown). In addition, if the ground element 110 and the second coupling branch 760 are both disposed on the first surface E1 of the dielectric substrate 170, the first conductive via element 752 will not be used.

An end of the connection portion 751 is coupled through the first conductive via element 752 to the common grounding point GPC, and another end of the connection portion 751 is coupled through the second conductive via element 753 to an end of the coil portion 754. The first coupling segment 755 has a first end 756 and a second end 757. The first end 756 of the first coupling segment 755 is coupled through the first connection segment 758 to another end of the coil portion 754. The second end 757 of the first coupling segment 755 is an open end. In some embodiments, the second end 757 of the first coupling segment 755 extends beyond the second end 132 of the first radiation element 130. A first coupling gap GC5 may be formed between the first radiation element 130 and the first coupling segment 755 of the first coupling branch 750. The width of the first coupling gap GC5 may be shorter than or equal to 3 mm. The second coupling branch 760 may substantially have an L-shape, which may be disposed between the first radiation element 130 and first coupling segment 755 of the first coupling branch 750. The second coupling branch 760 has a first end 761 and a second end 762. The first end 761 of the second coupling branch 760 is coupled to the common grounding point GPC. The second end 762 of the second coupling branch 760 is an open end. In some embodiments, the second end 762 of the second coupling branch 760 does not extend beyond the second end 132 of the first radiation element 130. Specifically, the second coupling branch 760 includes a second connection segment 768 adjacent to the first end 761 and a second coupling segment 765 adjacent to the second end 762. A second coupling gap GC6 may be formed between the first radiation element 130 and the second coupling branch 760. The width of the second coupling branch GC6 may be shorter than or equal to 2 mm. The antenna structure 700 can cover a low-frequency band and a high-frequency band. The low-frequency band may be from 600 MHz to 960 MHz. The high-frequency band may be from 1100 MHz to 6000 MHz. According to practical measurements, the incorporation of the coil portion 754 of the first coupling branch 750 can make the aforementioned low-frequency band shift and become lower. Other features of the antenna structure 700 of FIG. 7 are similar to those of the antenna structure 100 of FIG. 1A, FIG. 1B, FIG. 1C, and FIG. 1D. Accordingly, the two embodiments can achieve similar levels of performance.

Figure 8:
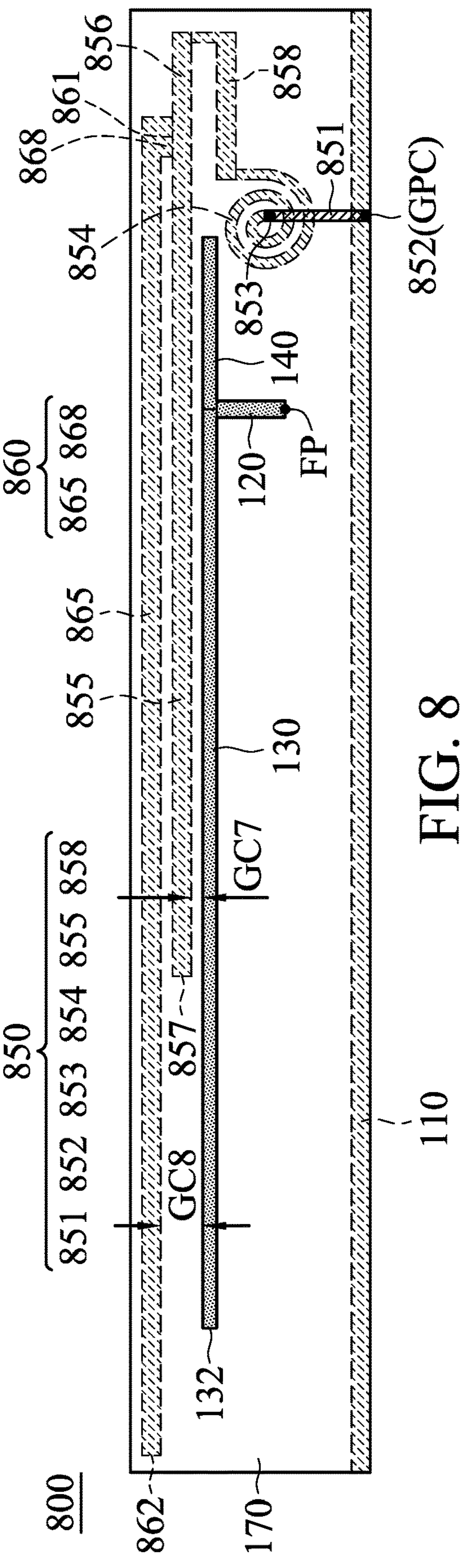
FIG. 8 is a top view of an antenna structure according to an embodiment of the invention.

FIG. 8 is a top view of an antenna structure 800 according to an embodiment of the invention. FIG. 8 is similar to FIG. 1A. In the embodiment of FIG. 8, the antenna structure 800 includes a ground element 110, a feeding radiation element 120, a first radiation element 130, a second radiation element 140, a first coupling branch 850, a second coupling branch 860, and a dielectric substrate 170. The dielectric substrate 170 has a first surface E1 and a second surface E2 which are opposite to each other. The first coupling branch 850 and the second coupling branch 860 are both coupled to a common grounding point GPC on the ground element 110. Specifically, the first coupling branch 850 includes a connection portion 851, a first conductive via element 852, a second conductive via element 853, a coil portion 854, a first coupling segment 855, and a first connection segment 858. The connection portion 851 is disposed on the first surface E1 of the dielectric substrate 170. The first conductive via element 852 and the second conductive via element 853 penetrate the dielectric substrate 170. The coil portion 854, the first coupling segment 855, the first connection segment 858, and the second coupling branch 860 are disposed on the second surface E2 of the dielectric substrate 170. However, the invention is not limited thereto. In alternative embodiments, the ground element 110, the first coupling segment 855 of the first coupling branch 850, and the second coupling branch 860 are disposed on the first surface E1 of the dielectric substrate 170, and they are connected thereto through corresponding conductive via elements (not shown).

An end of the connection portion 851 is coupled through the first conductive via element 852 to the common grounding point GPC, and another end of the connection portion 851 is coupled through the second conductive via element 853 to an end of the coil portion 854. The first coupling segment 855 has a first end 856 and a second end 857. The first end 856 of the first coupling segment 855 is coupled through the first connection segment 858 to another end of the coil portion 854. The second end 857 of the first coupling segment 855 is an open end. In some embodiments, the second end 857 of the first coupling segment 855 does not extend beyond the second end 132 of the first radiation element 130. A first coupling gap GC7 may be formed between the first radiation element 130 and the first coupling segment 855 of the first coupling branch 850. The width of the first coupling gap GC7 may be shorter than or equal to 2 mm. The second coupling branch 860 may substantially have an L-shape. The first coupling segment 855 of the first coupling branch 850 is disposed between the first radiation element 130 and the second coupling branch 860. The second coupling branch 860 has a first end 861 and a second end 862. The first end 861 of the second coupling branch 860 is coupled to the first coupling segment 855 of the first coupling branch 850. The second end 862 of the second coupling branch 860 is an open end. In some embodiments, the second end 862 of the second coupling branch 860 extends beyond the second end 132 of the first radiation element 130. Specifically, the second coupling branch 860 includes a second connection segment 868 adjacent to the first end 861 and a second coupling segment 865 adjacent to the second end 862. A second coupling gap GC8 may be formed between the first radiation element 130 and the second coupling branch 860. The width of the second coupling branch GC8 may be shorter than or equal to 3 mm. The antenna structure 800 can cover a low-frequency band and a high-frequency band. The low-frequency band may be from 600 MHz to 960 MHz. The high-frequency band may be from 1100 MHz to 6000 MHz. According to practical measurements, the incorporation of the coil portion 854 of the first coupling branch 850 can make the aforementioned low-frequency band and high-frequency band shift and become lower. Other features of the antenna structure 800 of FIG. 8 are similar to those of the antenna structure 100 of FIG. 1A, FIG. 1B, FIG. 1C, and FIG. 1D. Accordingly, the two embodiments can achieve similar levels of performance.

The invention proposes a novel antenna structure. In comparison to the conventional design, the invention has at least the advantages of small size, wide bandwidth, low profile, and low manufacturing cost. Therefore, the invention is suitable for application in a variety of mobile communication devices.

Note that the above element sizes, element shapes, and frequency ranges are not limitations of the invention. An antenna designer can fine-tune these settings or values according to different requirements. It should be understood that the antenna structure of the invention is not limited to the configurations of FIGS. 1-8. The invention may merely include any one or more features of any one or more embodiments of FIGS. 1-8. In other words, not all of the features displayed in the figures should be implemented in the antenna structure of the invention.

Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:
- a feeding radiation element, having a feeding point;
- a first radiation element, coupled to the feeding radiation element;
- a second radiation element, coupled to the feeding radiation element, wherein the second radiation element and the first radiation element substantially extend in opposite directions;
- a first coupling branch, coupled to a first grounding point on a ground element, and extending across the first radiation element, wherein the first coupling branch comprises a first coil portion and a first connection portion; and
- a dielectric substrate, having a first surface and a second surface opposite to each other, wherein the feeding radiation element, the first radiation element, the second radiation element, and the first connection portion of the first coupling branch are distributed over the first surface of the dielectric substrate, and the first coil portion of the first coupling branch is distributed over the second surface of the dielectric substrate.

2. The antenna structure as claimed in claim 1, further comprising:
- a second coupling branch, coupled to a second grounding point on the ground element, and disposed adjacent to the second radiation element.

3. The antenna structure as claimed in claim 2, wherein the second coupling branch substantially has an inverted L-shape.

4. The antenna structure as claimed in claim 2, wherein the second coupling branch extends across the second radiation element and comprises a second coil portion.

5. The antenna structure as claimed in claim 4, wherein the second coupling branch further comprises:
- a second connection portion, disposed on the first surface of the dielectric substrate;
- a third conductive via element, penetrating the dielectric substrate, wherein an end of the second connection portion is coupled through the third conductive via element to the second grounding point;
- a fourth conductive via element, penetrating the dielectric substrate, wherein another end of the second connection portion is coupled through the fourth conductive via element to an end of the second coil portion;
- a second connection segment; and
- a second coupling segment, coupled through the second connection segment to another end of the second coil portion, wherein the second connection segment, the second coupling segment, and the ground element are disposed on the second surface of the dielectric substrate.

6. The antenna structure as claimed in claim 5, wherein the second connection portion of the second coupling branch substantially has a straight-line shape or a spiral shape.

7. The antenna structure as claimed in claim 1, wherein the first coupling branch further comprises:
- a first conductive via element, penetrating the dielectric substrate, wherein an end of the first connection portion is coupled through the first conductive via element to the first grounding point;
- a second conductive via element, penetrating the dielectric substrate, wherein another end of the first connection portion is coupled through the second conductive via element to an end of the first coil portion;
- a first connection segment; and
- a first coupling segment, coupled through the first connection segment to another end of the first coil portion, wherein the first connection segment, the first coupling segment, and the ground element are disposed on the second surface of the dielectric substrate.

8. The antenna structure as claimed in claim 1, wherein the first connection portion of the first coupling branch substantially has a straight-line shape or a spiral shape.

9. The antenna structure as claimed in claim 1, wherein the first radiation element comprises a third coil portion.

10. The antenna structure as claimed in claim 9, wherein the first radiation element further comprises:
- a third connection portion, disposed on the second surface of the dielectric substrate;

a fifth conductive via element, penetrating the dielectric substrate, wherein an end of the third connection portion is coupled through the fifth conductive via element to the third coil portion;

a straight-line portion, wherein the third coil portion and the straight-line portion are disposed on the first surface of the dielectric substrate; and a sixth conductive via element, penetrating the dielectric substrate, wherein another end of the third connection portion is coupled through the sixth conductive via element to the straight-line portion.

11. The antenna structure as claimed in claim 1, wherein the antenna structure covers a low-frequency band and a high-frequency band, the low-frequency band is from 600 MHz to 960 MHz, and the high-frequency band is from 1100 MHz to 6000 MHz.

12. The antenna structure as claimed in claim 11, wherein a total length of the feeding radiation element and the first radiation element is shorter than or equal to 0.5 wavelength of the low-frequency band.

13. The antenna structure as claimed in claim 11, wherein a total length of the feeding radiation element and the second radiation element is shorter than or equal to wavelength of the high-frequency band.

14. The antenna structure as claimed in claim 1, wherein the antenna structure covers a low-frequency band and a high-frequency band, the low-frequency band is from 600 MHz to 960 MHz, and the high-frequency band is from 1100 MHz to 6000 MHz.

15. An antenna structure, comprising:

a feeding radiation element, having a feeding point;

a first radiation element, coupled to the feeding radiation element;

a second radiation element, coupled to the feeding radiation element, wherein the second radiation element and the first radiation element substantially extend in opposite directions;

a first coupling branch, comprising a coil portion and a first coupling segment;

a second coupling branch, wherein the first coupling branch and the second coupling branch are coupled to a common grounding point on a ground element; and a dielectric substrate, having a first surface and a second surface opposite to each other, wherein the feeding radiation element, the first radiation element, and the second radiation element are distributed over the first surface of the dielectric substrate, and the coil portion of the first coupling branch is distributed over the second surface of the dielectric substrate;

wherein the feeding radiation element, the first radiation element, and the second radiation element are positioned between the ground element and the first coupling branch or the second coupling branch.

16. The antenna structure as claimed in claim 15, wherein a combination of the feeding radiation element, the first radiation element, and the second radiation element substantially has a T-shape.

17. The antenna structure as claimed in claim 15, wherein the ground element comprises a grounding branch, and the common grounding point is positioned at an end of the grounding branch.

18. The antenna structure as claimed in claim 15, wherein the ground element and the first coupling segment of the first coupling branch are distributed over the first surface or the second surface of the dielectric substrate.

19. The antenna structure as claimed in claim 15, wherein the first coupling branch further comprises:

a connection portion, disposed on the first surface of the dielectric substrate;

a first conductive via element, penetrating the dielectric substrate, wherein an end of the connection portion is coupled through the first conductive via element to the common grounding point;

a second conductive via element, penetrating the dielectric substrate, wherein another end of the connection portion is coupled through the second conductive via element to an end of the coil portion; and a first connection segment, wherein the first coupling segment is coupled through the first connection segment to another end of the coil portion, and wherein the first connection segment, the first coupling segment, and the ground element are disposed on the second surface of the dielectric substrate.

20. The antenna structure as claimed in claim 15, wherein the second coupling branch substantially has a meandering shape or an L-shape, and is disposed adjacent to the first coupling branch.

* * * * *